Patented Nov. 3, 1936

2,059,619

UNITED STATES PATENT OFFICE 2,059,619

TREATMENT OF BENZYL CELLULOSE

David Traill, Ardrossan, Scotland, assignor to Imperial Chemical Industries Limited, a corporation of Great Britain No Drawing. Application May 17, 1935, Serial No. 22,116. In Great Britain May 28, 1934

4 Claims. (Cl. 260—152)

This invention relates to the treatment of benzyl cellulose and, more particularly, to a treatment for the purification of benzyl cellulose to adapt it for use in plastics, and the like, containing dyestuffs.

Benzyl cellulose, even after the application of heretofore proposed purification treatments, may contain sufficient impurity to render it unsuitable for certain purposes. Particularly, it has been found that, when the benzyl cellulose on the market today is made into a plastic and pigmented with dyestuffs of the rhodamine class, such as are used in the preparation of dental blanks having the natural color of the gums, the compositions may change color, becoming muddy and somewhat blue in shade during the incorporation of the dyestuff at a raised temperature.

It has been discovered that these highly undesirable effects are due to the retention by the benzyl cellulose of an impurity of an aldehydic nature and an object of the present invention is to provide an improved method of treating benzyl cellulose whereby the aldehydic impurity may be removed. Other objects of the invention will be apparent from the description given hereinafter.

The above objects are accomplished according to the present invention by treating benzyl cellulose in a medium adapted to swell but not dissolve the benzyl cellulose, said medium containing a substantial quantity of an aqueous solution of an alkaline metal bisulfite dissolved therein.

In carrying out the treatment of the present invention, it is preferred to agitate the benzyl cellulose with a liquid medium containing the aqueous alkali metal bisulfite for a considerable period at a raised temperature until a test portion, after filtering, repeated washing and neutralization, shows the requisite freedom from aldehydic bodies.

In the following example, a specific embodiment of the invention is illustrated:

Example 1.—500 cc. of a filtered, saturated solution of sodium bisulfite in water are mixed with 1625 cc. of industrial alcohol and 375 cc. of benzene. 500 grams of benzyl cellulose, in the form of dried granules, are then added and the mixture is stirred and heated under a reflux condenser until it boils freely, mechanical stirring being continued for 2 hours at this temperature. The benzyl cellulose is filtered, allowed to cool, and subjected to a repetition of the above process.

At the end of the second extraction, the benzyl cellulose is filtered off and washed thoroughly with water in a mechanical mortar, after which it is suspended in an aqueous solution of sodium bicarbonate and agitated for 3 hours. It is then washed with water until the pH determination shows that the washings are neutral and it is then subsequently dried in warm air.

It will be understood that the above example is merely illustrative and that the invention includes within its spirit the treatment of benzyl cellulose with a liquid capable of swelling but not dissolving it, said liquid containing an aqueous solution of an alkaline metal sulfite, and thereafter washing and neutralizing the treated benzyl cellulose.

The liquid medium adapted to swell but not dissolve the benzyl cellulose may be selected from a wide variety of organic liquids, as will be obvious to those skilled in the art. It is preferred to use a mixture of a liquid aromatic hydrocarbon such as benzene, toluene, or xylene, and an alcohol such as ethyl alcohol.

In the preferred embodiment a saturated aqueous solution of sodium bisulfite is mixed with the liquid medium adapted to swell but not dissolve the benzyl cellulose. This causes a substantial amount of the sodium bisulfite to be precipitated as a fine crystalline solid but, when the benzyl cellulose is added, a considerable part, but not all, of the sodium bisulfite is redissolved thus insuring that the liquid medium is saturated with sodium bisulfite. It is not essential that a saturated solution of sodium bisulfite be employed, although a concentrated solution of the salt is desirable. Other alkali metal bisulfites may be used in place of sodium bisulfite.

It will be understood that the time required for the treatment of the benzyl cellulose will depend partly upon the temperature which is used and, in order that the time may be as short as possible, it is preferred to employ a boiling solution, or even to conduct the treatment under pressure. Mechanical agitation is also advantageous since it prevents caking of the benzyl cellulose.

It is preferred that the treatment with the liquid medium containing the dissolved alkali metal sulfite be repeated; the second extracting liquor may be employed as the first extracting liquor for a second batch of benzyl cellulose. It has been found that the bisulfite remains rather firmly associated with the swollen benzyl cellulose and usually it is not sufficient simply to wash the treated benzyl cellulose with water in order to remove it. As the bisulfite remaining may have a disadvantageous effect upon the color of the benzyl cellulose or the dyestuff during incorporation at raised temperature, it is desirable to treat the benzyl cellulose with an alkaline solution after it has been thoroughly washed with water. For this purpose an aqueous solution of sodium bicarbonate, as used in Example 1, is particularly suitable. As an additional precaution, a trace of alkali may be left in the benzyl cellulose instead of washing it completely free from alkali. For example, the benzyl cellulose may be washed with water until a pH determination shows that the washings are still alkaline within the pH range of 8–10 in the case where the dyestuff to be used would not be affected by the alkali.

It appears fairly definite that aldehydic impurities contained in commercial benzyl cellulose are responsible for the trouble encountered in using dyestuffs of the rhodamine type to pigment benzyl cellulose compositions. In any event, the process of the present invention does remove aldehydic impurities and it is a fact that, after such treatment, no discoloration of rhodamine dyestuffs occurs when they are worked into the treated benzyl cellulose even at raised temperature.

An advantage of the present invention is that it provides a method of treating benzyl cellulose so that a product free of aldehydic impurities can be obtained. This allows the use of various dyestuffs with the benzyl cellulose in plastics and coating compositions, and the like, without fear of discoloration, or other deleterious action on the dyestuff. For example, the product purified as in Example 1, when made into a plastic and pigmented with 0.2% titanium dioxide and tinted with a mixture of rhodamine GS and rhodamine 6 GBS, gives a product of satisfactory color after incorporation on hot rolls.

As many apparently widely different embodiments of this invention may be made without departing from the spirit and scope thereof, it is to be understood that the invention is not limited to the specific embodiments thereof except as defined in the appended claims.

I claim:

1. Method of treating benzyl cellulose to remove aldehydic impurities comprising heating the benzyl cellulose in a liquid medium made by combining a concentrated aqueous solution of an alkali metal bisulfite with a water-miscible alcohol and a liquid aromatic hydrocarbon from the group consisting of benzene, toluene, and xylene.

2. Method of treating benzyl cellulose to remove aldehydic impurities comprising boiling the benzyl cellulose in a liquid medium made by combining ethyl alcohol and benzene with a concentrated aqueous solution of sodium bisulfite, for about two hours, filtering out said benzyl cellulose, again boiling it in a fresh portion of said liquid medium, washing the benzyl cellulose, suspending it in an aqueous sodium bicarbonate solution for about three hours and then washing the benzyl cellulose thus rendered somewhat alkaline in reaction, with water until the washings show a pH of 8–10.

3. Method of treating benzyl cellulose to remove aldehydic impurities comprising heating the benzyl cellulose in a liquid medium made by combining a concentrated aqueous solution of an alkali metal bisulfite with an organic liquid medium adapted to swell but not dissolve the benzyl cellulose.

4. Method of treating benzyl cellulose to remove aldehydic impurities comprising heating the benzyl cellulose in a liquid medium made by combining a concentrated aqueous solution of an alkali metal bisulfite with ethyl alcohol and benzene.

DAVID TRAILL.